(12) United States Patent
Yoshikawa et al.

(10) Patent No.: US 7,268,805 B2
(45) Date of Patent: *Sep. 11, 2007

(54) IMAGE PICK-UP DEVICE

(75) Inventors: Koichi Yoshikawa, Kanagawa (JP); Shigeru Tajima, Kanagawa (JP)

(73) Assignee: Sony Corporation, Tokyo (JP)

( * ) Notice: Subject to any disclaimer, the term of this patent is extended or adjusted under 35 U.S.C. 154(b) by 675 days.

This patent is subject to a terminal disclaimer.

(21) Appl. No.: 10/415,207

(22) PCT Filed: Aug. 9, 2002

(86) PCT No.: PCT/JP02/08156

§ 371 (c)(1),
(2), (4) Date: Apr. 24, 2003

(87) PCT Pub. No.: WO03/021347

PCT Pub. Date: Mar. 13, 2003

(65) Prior Publication Data

US 2004/0042782 A1   Mar. 4, 2004

(30) Foreign Application Priority Data

Aug. 28, 2001  (JP) .............................. 2001-257584

(51) Int. Cl.
  *H04N 5/225* (2006.01)
  *H04N 7/00* (2006.01)
  *H04N 5/238* (2006.01)
  *G03B 37/00* (2006.01)
  *G02B 13/06* (2006.01)

(52) U.S. Cl. ..................... 348/218.1; 348/36; 348/369; 348/373; 352/69; 359/725

(58) Field of Classification Search .................. 348/36, 348/38–39, 218.1, 262, 264, 351, 369, 373–376; 352/69; 359/725
See application file for complete search history.

(56) References Cited

U.S. PATENT DOCUMENTS 4,081,812 A   3/1978   Flother (Continued)

FOREIGN PATENT DOCUMENTS

JP   3-142437   6/1991

(Continued)

OTHER PUBLICATIONS

English Abstracts of foreign references cited in the IDS filed on Apr. 24, 2003. (References: JP 2001-194715, JP 9-331475, JP 7-67020, JP 3-142437, JP 11-46317 and JP 10-206985).*

*Primary Examiner*—Ngoc-Yen Vu
*Assistant Examiner*—Daniel Pasiewicz
(74) *Attorney, Agent, or Firm*—Finnegan, Henderson, Farabow, Garrett & Dunner, L.L.P.

(57) ABSTRACT

In order to prevent the upper part of a subject such as a multistoried building or the like from being photographed in a short form when a wide angle shot is carried out, image pick-up means 5 are provided at intervals of 90 degrees on a base 4. The image pick-up means 5 respectively have front convex lenses 8 and image pick-up parts 7 along vertical planes parallel to each other. The front convex lenses 8 are displaced along the vertical planes so as to be provided at higher positions than those of the image pick-up parts 7. The NP points of the image pick-up means 5 are arranged to respectively correspond to each other so that a parallax is reduced.

4 Claims, 5 Drawing Sheets

U.S. PATENT DOCUMENTS

| | | | |
|---|---|---|---|
| 5,200,818 A * | 4/1993 | Neta et al. | 348/39 |
| 5,657,073 A | 8/1997 | Henley | |
| 5,889,553 A * | 3/1999 | Kino et al. | 348/218.1 |
| 5,937,212 A * | 8/1999 | Kurahashi et al. | 396/20 |
| 6,870,680 B2 * | 3/2005 | Yoshikawa et al. | 359/618 |
| 7,006,123 B2 * | 2/2006 | Yoshikawa et al. | 348/36 |

FOREIGN PATENT DOCUMENTS

| | | |
|---|---|---|
| JP | 7-67020 | 3/1995 |
| JP | 3030680 | 8/1996 |
| JP | 9-331475 | 12/1997 |
| JP | 10-206985 | 8/1998 |
| JP | 11-46317 | 2/1999 |
| JP | 2001-194715 | 7/2001 |

* cited by examiner

PRIOR ART

IMAGE PICK-UP DEVICE

TECHNICAL FIELD

The present invention relates to an image pick-up device in which the length in the direction of height of a photographed image is prevented from being photographed in a compressed form in a high position of a multistoried building or the like.

BACKGROUND ART

When a subject such as a high building is photographed by a video camera, the video camera needs to be directed upward to set an angle formed by the optical axis of the video camera and the subject 1 to an acute angle α, as shown in FIG. 6. Here, the lens of the video camera or the like comprises a plurality of lenses. They are equivalently represented by one convex lens 2. Both the convex lens 2 and an image pick-up element 3 are arranged at right angles to the central axis of the video camera. The parts A, B and C of the subject 1 correspond to A', B' and C' on the image pick-up element 3. While the point B is an intermediate height position between the points A and C, a distance between the points A' and B' is shorter than a distance between the points B' and C', so that the part of a high position of the subject 1 is photographed in a compressed and short form.

DISCLOSURE OF THE INVENTION

In order to solve the above-described problem, the image pick-up element 3 may be displaced in parallel with the convex lens 2 as shown in FIG. 2. Since the subject 1 is parallel to the image pick-up element 3 in FIG. 2., the relation that AB:BC is equal to A'B':B'C' is achieved. Thus, the image of the subject 1 is not compressed or enlarged in the direction of its length. In such a configuration called a low angle shot, a point D cannot be photographed and only a part above the point C is a range capable of being photographed.

However, when a wide angle shot for an entire circumference of 360 degrees on a horizontal plane such as a panoramic shot is carried out, the same problem as mentioned above is likewise generated.

Thus, it is an object of the present invention to provide an image pick-up device in which the above-described problems are solved.

In the structure of an image pick-up device defined in claim 1 to achieve the above-described object, the image pick-up device in which a part to be photographed is divided into a plurality of parts to be photographed, a plurality of image pick-up means for individually photographing the respective parts to be photographed are provided in the same planes on a circumferential direction and images from the image pick-up means are combined together to obtain a wide angle image is characterized in that the image pick-up means respectively include equivalent convex lenses and an image pick-up parts on mutually parallel planes and the equivalent convex lenses and the image pick-up parts are respectively displaced relatively along the mutually parallel planes, In the above-described image pick-up device, since the equivalent convex lenses are displaced relative to the image pick-up elements in a wide angle shot, an unnaturalness that the length of the subject in the direction of its height at a high position is compressed is eliminated when the subject such as a multistoried building is photographed.

The structure of an image pick-up device defined in claim 2 according to claim 1 is characterized in that principal rays which pass through a Gaussian area are selected among principal rays passing through the centers of diaphragms provided in the image pick-up means, straight line components are extended in object spaces in the principal rays to set points where the straight line components intersect an optical axis as NP points, and the other NP points are arranged within an NP point area of a sphere having any one NP point as a center among the NP points in the respective image pick-up means.

In such an image pick-up device, since the other NP points are arranged in the NP point area of one image pick-up mean in the image pick-up means, the wide angle image having no parallax can be obtained.

The structure of an image pick-up device defined in claim 3 according to claim 2 is characterized in that the radial dimension of the sphere is set substantially to 20 mm.

In the above-described image pick-up device, since the other NP points are arranged in the NP point area in the sphere having any one NP point as the center and a radial dimension of substantially 20 mm, the wide angle image having no parallax is obtained.

The structure of an image pick-up device defined in claim 4 according to claim 3 is characterized in that the plural image pick-up means are provided along the circumferential direction and on horizontal planes, and the equivalent convex lenses are vertically displaced relative to the image pick-up parts.

In the above-described image pick-up device, is carried out a photographing for obtaining a wide angle image throughout a periphery of 360 degrees on a horizontal plane in which the image is not compressed in the direction of its height at the high position.

The structure of an image pick-up device defined in claim 5 according to claim 4 is characterized in that an adjusting mean is provided for changing an amount of displacement of each equivalent convex lens relative to each image pick-up part.

In the above-described image pick-up device, can be carried out a photographing for obtaining a wide angle image throughout a periphery of 360 degrees on a horizontal plane in which a part of the image in a high position is not compressed in the direction of its height and the height of the shooting range can be freely changed.

The above-described points NP and the NP point area will be defined as described below. FIG. 5 shows a state that light reflected on a subject which is not shown in the drawings reaches an image pick-up part 301 through an equivalent convex lens 300 to form an image on the image pick-up part 301. The equivalent convex lens represents the assembly of a single or a plurality of lenses for forming the image on the image pick-up part as one convex lens. The equivalent convex lens is composed not only of lenses, but also of convex mirrors or concave mirrors. Here, the equivalent convex lens 300 comprises lens 302 to lens 308 and a diaphragm 309 is provided between the lens 304 and the lens 305. A principal ray 311 passing through a Gaussian area where the aberration of the lenses can be neglected is selected among innumerable principal rays passing through the center of the diaphragm 309. The straight line component of the selected principal ray 311 in an object space 312 is extended so that a point at which the straight line component intersects an optical axis 310 is determined to be an NP (non-parallax) point 313 and an area in a sphere having the NP point as a center and a radius of 20 mm or less is determined to be an NP area 314. The NP point area is determined to be located within the sphere having the NP point as the center and the radius of 20 mm, because when NP points are located at mutually near positions in such a manner that the NP points of other image pick-up means are located within the sphere having the NP point of any one image pick-up means as the center and the radius of 20 mm, the generation of parallax can be suppressed so as to be negligible. Reference numeral 315 designates an image space.

BEST MODE FOR CARRYING OUT THE INVENTION

Now, embodiments of an image pick-up device according to the present invention will be described.

(a) First Embodiment

Initially, a first embodiment of an image pick-up device will be described by referring to FIG. 1. In this embodiment, an image pick-up element is fixed to the lens to fix a shooting range.

Figure 1:
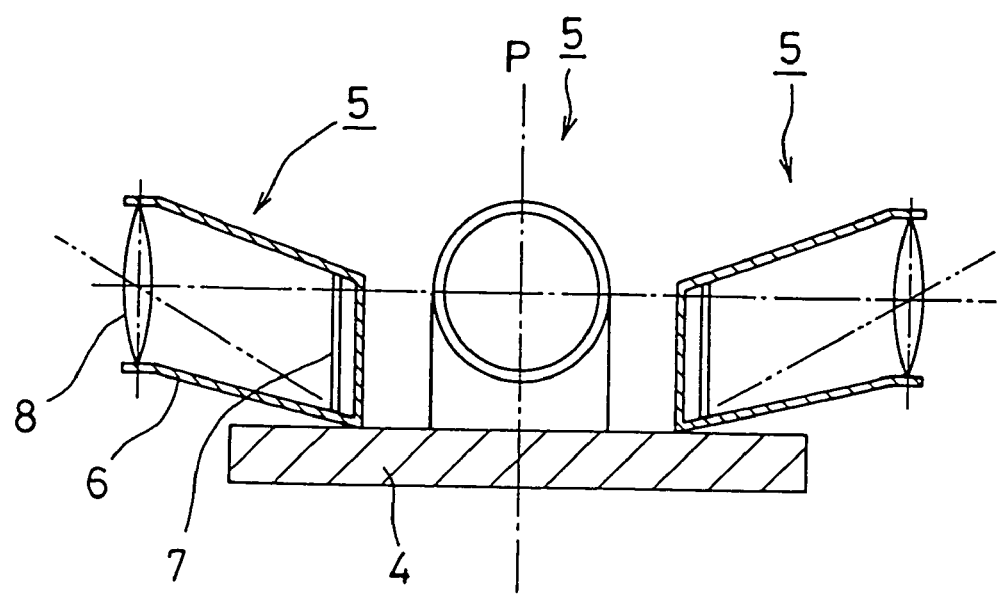
FIG. 1 is a structural view showing a first embodiment of an image pick-up device according to the present invention.
Figure 2:
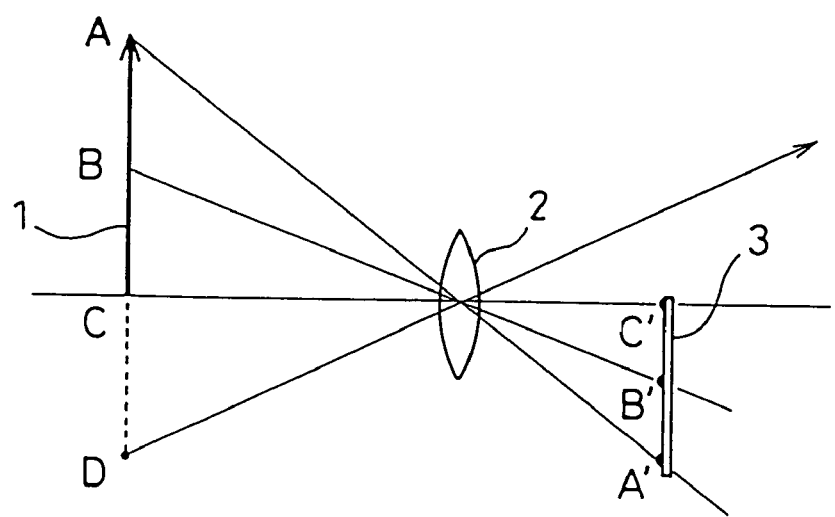
FIG. 2 is an operational explanatory view of the first embodiment of the image pick-up device according to the present invention.

As shown in FIG. 1, on the upper surface of a base 4, four image pick-up means 5 are provided at equal intervals on the periphery of a circle having the center of the base 4 as its center.

Since the image pick-up means 5 respectively have the same structure, one of them will be described. Reference numeral 6 designates a bottomed tubular holding member, 7 designates an image pick-up element (image pick-up part) and 8 designates a front convex lens (equivalent convex lens). The image pick-up element 7 is parallel to the front convex lens 8. The front convex lens 8 is set to a high position relative to the position of the image pick-up element 7. The value of the height is a previously calculated value. The illustration of treating means connected to the image pick-up element 7 is omitted.

The relation between these image pick-up means 5 is determined as described below. That is, the NP points of the image pick-up means 5 are respectively arranged on one point on a center line P passing through the center of the base 4.

In such an image pick-up device, can be carried out a wide angle shot of a periphery of 360 degrees in which the part of a high position of a multistoried building or the like is not compressed in the direction of its height. Further, since the NP points of the image pick-up means 5 are respectively arranged on one point, a wide angle image having no parallax is obtained.

(b) Second Embodiment

Now, a second embodiment will be described below. In the second embodiment, an image pick-up element moves vertically relative to a lens so that a shooting range can be changed.

Figure 3:
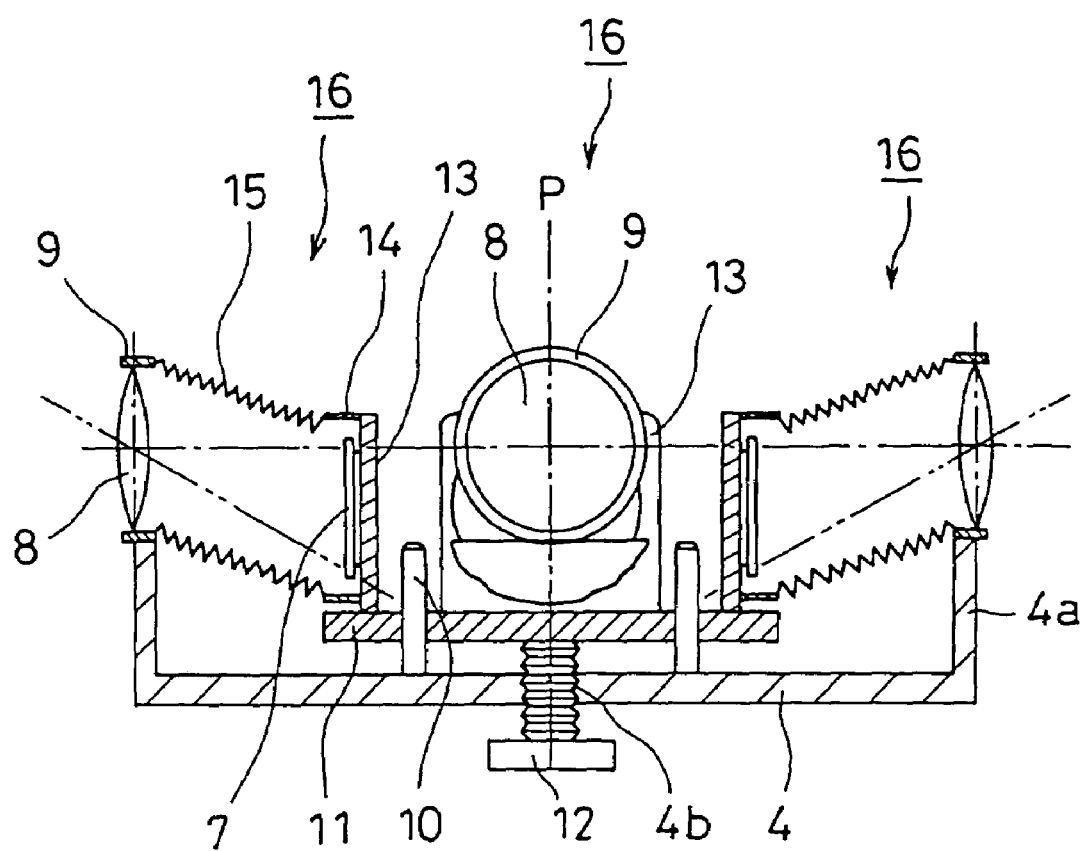
FIG. 3 is a structural view of a second embodiment of the image pick-up device according to the present invention.

As shown in FIG. 3, a tubular support part 4a is formed integrally with the outer peripheral part of a base 4. Four ring shaped lens tubes 9 are fixed onto the support part 4a at intervals of 90 degrees in the horizontal direction. A front convex lens 8 is fixed to the inner part of each of the lens tube 9.

On the other hand, four guide pins 10 stands upright on the central part of the support part 4. The guide pins 10 are inserted into guide holes formed on a lift 11. Driving means for driving the lift 11 is provided. That is, an internal thread part 4b is formed at the central part of the support part 4 and an adjusting screw (adjusting means) 12 is screwed to the internal thread part 4b from the lower part of the support part 4. The end of the adjusting screw 12 is connected to the lift 11 in a freely rotating state.

To positions corresponding to the lens tubes 9 on the lift 11, image pick-up elements 7 are attached through support plates 13. To the support plates 13, lens tubes 14 are fixed so as to surround the image pick-up elements 7. The corresponding lens tubes 14 are connected together through bellows 15. Thus, four image pick-up means 16 are formed.

In the above-described image pick-up device, can be carried out a wide angle shot of a periphery of 360 degrees on a horizontal plane in which a part of a high position is not compressed in the direction of height. In FIG. 3, when the height of the image pick-up elements 7 is substantially the same as the height of the front convex lenses 8, an ordinary wide angle image of a periphery of 360 degrees on the horizontal plane is obtained. When the adjusting screw 12 is rotated to lower the image pick-up elements 7 together with the lift 11, is obtained the wide angle image as described above in which a part at a high position is not compressed in the direction of its height upon photographing the high position. The height of a shooting range is adjusted by rotating the adjusting screw 12.

Since other structures and operations are the same as those of the first embodiment, an explanation is omitted.

In the second embodiment, although the shooting range in the direction of height is obtained by moving the image pick-up device upward, the image pick-up device may be moved downward by replacing the upper part of the image pick-up device by the lower part. The image pick-up device may be moved in both directions including upward and downward by lengthening the adjusting screw 12.

(c) Third Embodiment

Finally, a third embodiment will be described below by referring to FIG. 4. This image pick-up device is preferably suitably used for photographing the interior of a building, a concert hall, a street scene or the like.

Figure 4A:
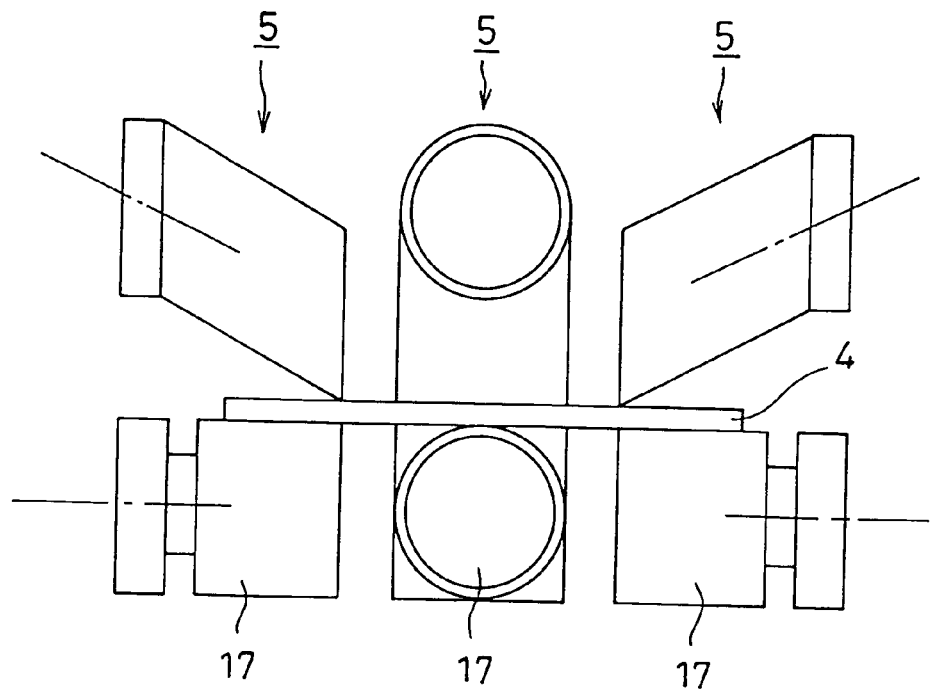
FIG. 4A is a front view showing a third embodiment of the image pick-up device according to the present invention.
Figure 4B:
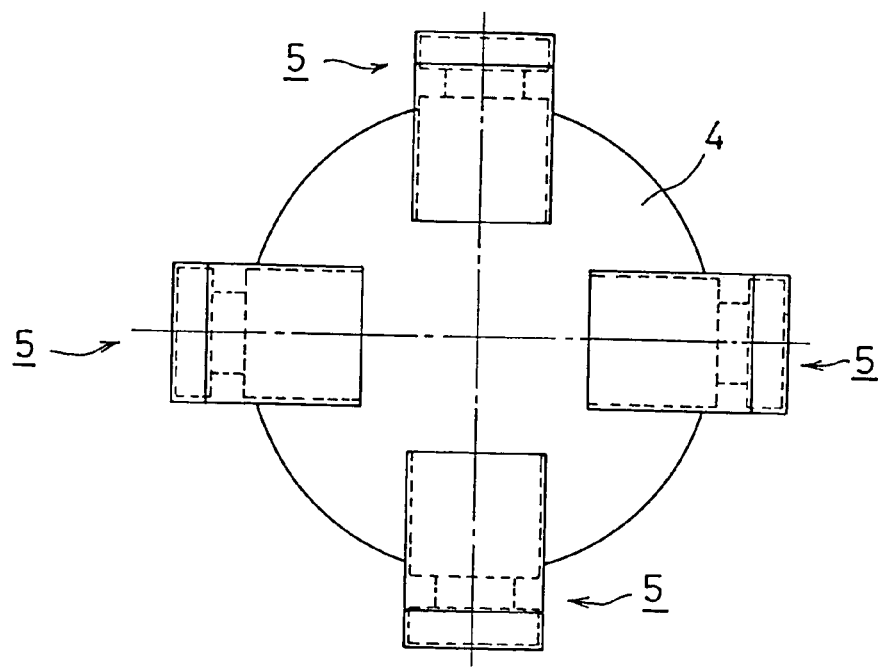
FIG. 4B is a plan view showing the third embodiment of the image pick-up device according to the present invention.
Figure 5:
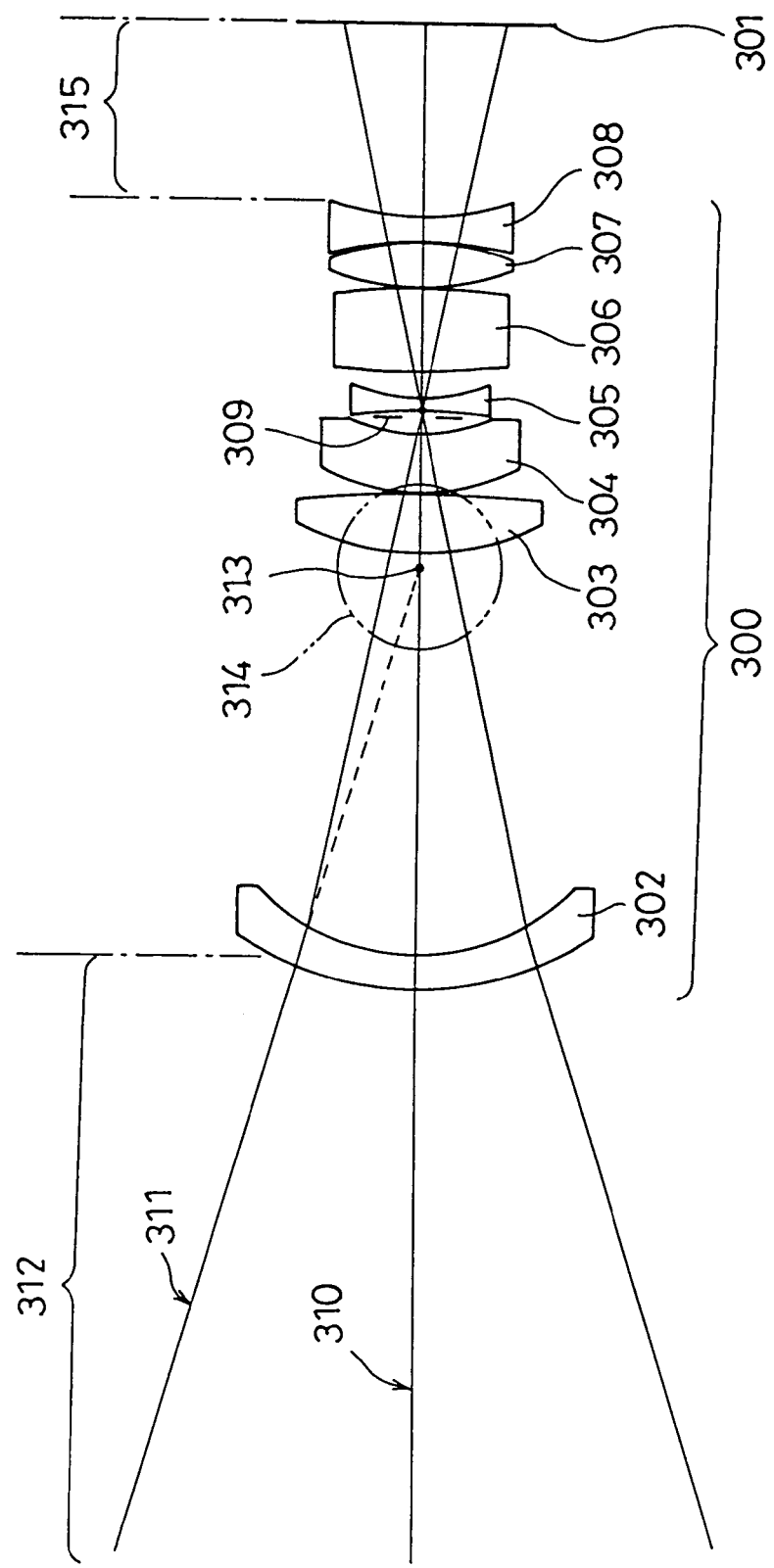
FIG. 5 is an explanatory view for defining points NP and an NP point area of image pick-up means in the present invention.
Figure 6:
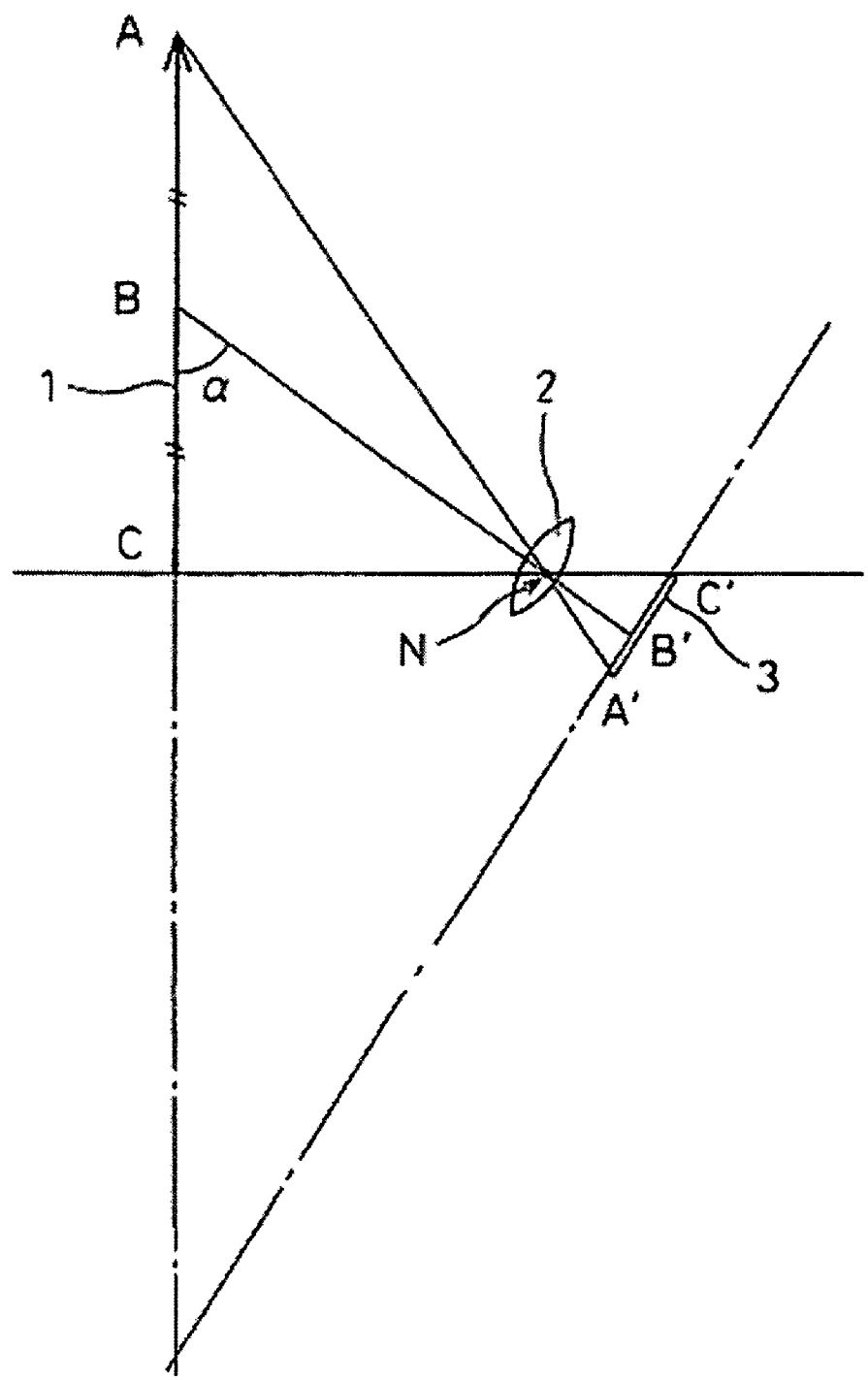
FIG. 6 is an explanatory view showing that when a subject such as a multistoried building is photographed, an upper part is photographed to be compressed in a short form.

As shown in FIG. 4, image pick-up means 17 are arranged at intervals of 90 degrees in the circumferential direction. The four image pick-up means 5 mounted on the base and having the structure shown in FIG. 1 are provided thereon. The structure above the base 4 is the same as that of the first embodiment. In the structure below the base 4, the NP points of the image pick-up means 17 are respectively arranged on the same point. The NP points of the image pick-up means 17 are also arranged on the same positions as those of the NP points of the image pick-up means 5. In other words, the NP points of all the image pick-up means including the image pick-up means 5 and the image pick-up means 17 are arranged on the same position.

In the above-described image pick-up device, an image is added to the wide angle image in the first embodiment so that the scope of the image is vertically widened.

A single or a plurality of image pick-up means directed just above are added to the first to third embodiments and arranged so that the NP points of the added image pick-up means correspond to the NP points of the current image pick-up means. Accordingly, a hemispherical wide angle image can be obtained without generating a parallax. Further, in the above-described embodiments, although there are described cases in which the NP points of all the image pick-up means coincide mutually, when other NP points are arranged in any one NP point area in the image pick-up means, the generation of parallax can be suppressed so as to be negligible.

The invention claimed is:

1. An image pick-up device in which a part to be photographed is divided into a plurality of parts to be photographed, a plurality of image pick-up means for individually photographing the respective parts to be photographed are provided in the same planes along a circumferential direction, and images from the image pick-up means are combined together to obtain a wide angle image, wherein the image pick-up means respectively include equivalent convex lenses and an image pick-up parts on mutually parallel planes and the equivalent convex lenses and the image pick-up parts are respectively displaced relatively along the mutually parallel planes, wherein principal rays which pass through a Gaussian area are selected among principal rays passing through the centers of diaphragms provided in the image pick-up means, straight line components are extended in object spaces in the principal rays to set points where the straight line components intersect an optical axis as NP points, and other NP points are arranged within an NP point area of a sphere having any one NP point as a center among the NP points in the respective image pick-up means.

2. An image pick-up device according to claim 1, wherein the radial dimension of the sphere is set substantially to 20 mm.

3. An image pick-up device according to claim 2, wherein the plural image pick-up means are provided along the circumferential direction on horizontal planes and the equivalent convex lenses are vertically displaced relative to the image pick-up parts.

4. An image pick-up device according to claim 3, wherein an adjusting mean is provided for changing an amount of displacement of each equivalent convex lens relative to each image pick-up part.

* * * * *